United States Patent
Honji et al.

(10) Patent No.: US 7,993,529 B2
(45) Date of Patent: Aug. 9, 2011

(54) TREATMENT APPARATUS OF ORGANIC COMPOUNDS INCLUDED IN WASTE WATER, AND A TREATMENT SYSTEM OF ORGANIC COMPOUNDS INCLUDED IN WASTE WATER

(75) Inventors: Akio Honji, Hitachinaka (JP); Hayahito Ishii, Hitachinaka (JP); Akira Mochizuki, Mito (JP); Norihide Saho, Tsuchiura (JP); Tsutomu Tsuyama, Yokohama (JP); Hisashi Isogami, Ushiku (JP)

(73) Assignees: Hitachi, Ltd., Tokyo (JP); Hitachi Kyowa Engineering Co., Ltd., Ibaraki (JP)

( * ) Notice: Subject to any disclaimer, the term of this patent is extended or adjusted under 35 U.S.C. 154(b) by 0 days.

(21) Appl. No.: 12/731,448

(22) Filed: Mar. 25, 2010

(65) Prior Publication Data
US 2010/0176039 A1   Jul. 15, 2010

Related U.S. Application Data

(62) Division of application No. 12/039,768, filed on Feb. 29, 2008, now Pat. No. 7,722,773.

(30) Foreign Application Priority Data

Apr. 9, 2007  (JP) ................ 2007-101498

(51) Int. Cl.
*C02F 3/00* (2006.01)
(52) U.S. Cl. ............. 210/748.17; 210/748.18; 210/663; 210/669; 210/670; 210/675; 210/676
(58) Field of Classification Search ............. 210/748.17, 210/748.18, 663, 669, 670, 675–676
See application file for complete search history.

(56) References Cited

U.S. PATENT DOCUMENTS

| | | | |
|---|---|---|---|
| 3,502,566 A | 3/1970 | Raymond et al. | |
| 4,395,337 A | 7/1983 | Clepiela | |
| 6,616,827 B2 * | 9/2003 | Nabekura et al. | 205/99 |
| 7,160,430 B2 * | 1/2007 | Shelp et al. | 205/617 |
| 7,731,920 B2 * | 6/2010 | Fthenakis et al. | 423/100 |
| 2002/0162453 A1 | 11/2002 | Kato | |

(Continued)

FOREIGN PATENT DOCUMENTS

EP  0 915 059 A1   5/1999

(Continued)

OTHER PUBLICATIONS

U.S. Appl. No. 11/718,524, filed May 3, 2007, Toshiaki Arato et al.

(Continued)

*Primary Examiner* — Chester T Barry
(74) *Attorney, Agent, or Firm* — Antonelli, Terry, Stout & Kraus, LLP.

(57) ABSTRACT

A treatment method of organic compounds included in waste water, comprising the steps of:
supplying waste water to an adsorber 2 filled with an adsorbent 3 therein for adsorbing the organic compounds in the waste water by the adsorbent 3 in the adsorber 2,
supplying a current between an anode 9 and a cathode 8 in water including an electrolyte in an electrolyzer 6 for electrolyzing the water including an electrolyte, and supplying an electrolyte resulting from electrolysis in the electrolyzer 6 to the adsorbent 3 in the adsorber 2 for contacting the electrolyte with the adsorbent 3, so that the organic compounds adsorbed by the adsorbent 3 are desorbed or decomposed.

12 Claims, 12 Drawing Sheets

U.S. PATENT DOCUMENTS

| | | |
|---|---|---|
| 2004/0007533 A1 | 1/2004 | Hasegawa |
| 2007/0022744 A1 | 2/2007 | Hemingway |

FOREIGN PATENT DOCUMENTS

| | | |
|---|---|---|
| GB | 1 284 572 | 8/1972 |
| GB | 2 044 239 | 10/1980 |
| JP | 55 159893 | 12/1980 |
| JP | 59-127691 | 7/1984 |
| JP | 06-269776 | 9/1994 |
| JP | 8-192162 | 7/1996 |
| JP | 2004-25041 | 1/2004 |
| JP | 2005-074371 | 3/2005 |
| JP | 2005-131479 | 5/2005 |
| JP | 2006-314952 | 11/2006 |
| WO | WO 03/091166 A1 | 11/2003 |
| WO | WO 2006/049149 | 11/2006 |
| WO | WO 2007/125334 A1 | 11/2007 |

OTHER PUBLICATIONS

Peng et al., Application of Nanofiltration to water Management Options for Oil Sands Operations, XP 002499021, Desalination, Vo. 170, 2004, pp. 137-150.

Mackinnon, Oil Sands Water Quality Issues: Properties, Treatment and Discharge Options Conrad Oilsands Water Usage Workshop, 2004, XP002499023, URL:www.conrad.ab.ca/seminars/water_usage/2004/Oil_Sands_water_quality_properties_treatment_and_discharge_options_Mackinnon_.pdf.

Wallwork, Water Reuse and Treatment Issues in the Oil Sands Industry, Conrad Oilsands Water Usage Workshop, Online 2004, XP002499024, URL:www.conrad.ab.ca/seminars/water_usage/2004/water_reuse_and_treatment_issues_in_oilsands_wallwork.pdf.

Kiyokazu Takemura, et al. Ballast Water Purifying System Using Coagulating Technology, Environment Solution Technology (2007) vol. 6, No. 7.

Office Action of EP Application No. 09008038.3 dated Nov. 30, 2009 in English.

Korean Office of Appln. 10-2008-11832 dated Nov. 26, 2009 with translation.

Summons to attend oral proceedings pursuant to Rule 115(1) EPC dated May 21, 2010 for Application No. 08250622.1 0 1213/1997782.

* cited by examiner

TREATMENT APPARATUS OF ORGANIC COMPOUNDS INCLUDED IN WASTE WATER, AND A TREATMENT SYSTEM OF ORGANIC COMPOUNDS INCLUDED IN WASTE WATER

CROSS-REFERENCE TO RELATED APPLICATION

This application is a divisional application of U.S. application Ser. No. 12/039,768, filed Feb. 29, 2008, now U.S. Pat. No. 7,722,773 the contents of which are incorporated herein by reference.

CLAIM OF PRIORITY

The present application claims priority from Japanese application serial No. 2007-101498, filed on Apr. 9, 2007, the content of which is hereby incorporated by reference into this application.

BACKGROUND OF THE INVENTION

1. Field of the Invention

The present invention relates to a treatment method of organic compounds so as to oxidize and decompose water-soluble organic compounds, such as organic acids included in waste water, a treatment apparatus of the organic compounds, a treatment system of the organic compounds, and a system for collecting bitumen.

2. Description of Related Art

In an exemplary method of treatment of organic compounds in waste water, activated carbon is dipped in the waste water to remove the organic compounds by adsorption. In another method, the organic compounds are removed by flowing the waste water through an adsorber filled with an adsorbent.

In these methods, when the adsorbent reaches its saturation state, no more organic compounds can be adsorbed, in which case the adsorbent has to be replaced, it has to be removed and heated for reproduction, or a new adsorbent has to be added. In the case of replacement, the used activated carbon, which is an adsorbent, has to be handled as a waste material. When heating is performed for reproduction, adsorbed organic compounds are desorbed and thereby treatment of it is involved. Part of the activated carbon is oxidized and consumed during the heating for reproduction.

Another method is also known, in which the organic compounds in the waste water are oxidized and decomposed by activated oxygen generated by electrolysis. In an example of this method, waste liquid in a waste liquid storage tank is circulated between the waste liquid storage tank and an electrolyzer, and electrolysis is carried out in the electrolyzer so as to generate activated oxygen in the circulating waste liquid; the organic compounds are oxidized and decomposed by an oxidization and decomposition process by the generated activated oxygen (see Patent Document 1). In the Patent Document 1, the use of an adsorbent is not described.

In a method in which the organic compounds are adsorbed by activated carbon and undergoes electrolysis, liquid resulting from a secondary treatment of human waste is oxidized by ozone and then passed through an electrolysis apparatus in which granular activated carbon is filled between a cathode and an anode, and a current is supplied between the electrodes so that the organic compounds are occluded and adsorbed for electrolytic oxidation (see Patent Document 2). In the method described in the Patent Document 2, the granular adsorbent is also used as a plurality of electrodes, so the adsorbent must be electrically conductive, limiting the adsorbent to activated carbon. Since the activated carbon works as electrodes, the activated carbon used as the anode is oxidized and thus gradually consumed.

Patent Document 1: Japanese Patent Application Laid-open Publication No. Hei 8(1996)-192162

Patent Document 2: Japanese Application Patent Laid-open Publication No. Sho 59(1984)-127691

SUMMARY OF THE INVENTION

A large amount of oil content is included in water yielded from an oil field, which is brought during drilling in an oil field, and waste water resulting from the retrieval of heavy crude oil from oil sand. When the waste water is discharged to an ocean or a river, the oil content must be removed to or below a relevant discharge criterion.

Since environmental restrictions have been enforced in recent years, the amount of oil content included in waste water must be reduced to lower levels. When the waste water is recycled, the oil content must be removed because it adheres to pipes and causes other adverse effects.

A biological process is available as a method of treatment of oil included in waste water. However, the process takes time and thus a large apparatus is required. There are two types of oil included in waste water; one type of oil is oil content, which does not dissolve in water and is present as grease spots, and the other type of oil dissolves in water like organic acids. When a phase separating agent or coagulant is added to the oil content, the oil content can be separated as a flock.

For oil that dissolves in water, a method by which the oil is adsorbed by an adsorbent such as activated carbon to separate the oil can be used. When the absorption is saturated, however, the adsorbent must be replaced with a new one or heated to desorb organic compounds so as to reproduce the adsorbent. Post-treatment is also needed for the desorbed organic compounds; for example, the organic compounds must be burnt together with a fuel. Activated carbon also has a drawback; when the activated carbon is heated for reproduction, part of it is oxidized and consumed.

An object of the present invention is to provide a treatment method of organic compounds included in waste water, a treatment apparatus of the organic compounds, a treatment system of the organic compounds, and a bitumen collecting system; when the organic compounds in the waste water is separated, the organic compounds adsorbed in the adsorbent can thereby be effectively desorbed and decomposed, so reproduction of the adsorbent and decomposition of the organic compounds are carried out with ease.

(1) To achieve the above object, in the inventive treatment method of organic compounds included in waste water, comprising the steps of: supplying waste water to an adsorber filled with an adsorbent therein for adsorbing the organic compounds in the waste water by the adsorbent in the adsorber, supplying a current between an anode and a cathode in water including an electrolyte in an electrolyzer for electrolyzing the water including an electrolyte, and supplying an electrolyte resulting from electrolysis in the electrolyzer to the adsorbent in the adsorber for contacting the electrolyte with the adsorbent, so that the organic compounds adsorbed by the adsorbent are desorbed or discomposed.

(2) To achieve the above object, the inventive treatment apparatus of organic compounds included in waste water comprising: an adsorber filled with an adsorbent therein; and an electrolyzer having an anode and a cathode therein and a current being supplied between the anode and cathode so as to electrolyze water including an electrolyte; wherein waste water including the organic compounds is supplied to the adsorber for adsorbing the organic compounds by the adsorbent filled in the adsorber, an electrolyte resulting from electrolysis in the electrolyzer is circulated and supplied to the adsorber through pipes so that the organic compounds adsorbed by the adsorbent are desorbed or decomposed.

(3) To achieve the above object, the inventive treatment apparatus of organic compounds included in waste water comprising: a plurality of adsorbers filled with an adsorbent therein, respectively; and an electrolyzer including an anode and a cathode therein and a current being supplied between the anode and cathode so as to electrolyze water including an electrolyte; a selectively supplying means to supply the waste water including the organic compounds to one adsorber in a plurality of adsorbers for adsorbing the organic compounds included in the waste water by the adsorbent filled in the one adsorber and a concentration of the organic compounds are detected at an exit of the one adsorber and when adsorbing performance is lowered, a destination to supply the waste water is switched over to other adsorber in the plurality of adsorbers for adsorbing the organic compounds included in the waste water; and a pipe to supply and circulate an electrolyte resulting from electrolysis in the electrolyzer to the one adsorber, so that the organic compounds adsorbed by the adsorbent in the one adsorber, of which adsorbing performance is lowered, is desorbed or decomposed.

(4) In the treatment apparatus of organic compounds included in waste water, described in (2) or (3), wherein a main components of the organic compounds are organic acids.

(5) In the treatment apparatus of organic compounds included in waste water, described in (2) or (3), wherein the adsorbent is activated carbon or zeolite.

(6) In the treatment apparatus of organic compounds included in waste water, described in (2) or (3), wherein the anode comprises a titanium substrate and a layer including at least one of platinum, ruthenium, iridium, palladium, and rhodium formed on the titanium substrate.

(7) In the treatment apparatus of organic compounds included in waste water, described in (2) or (3), wherein the electrolyte is sodium chloride or potassium chloride.

(8) To achieve the above object, the inventive treatment system of organic compounds included in waste water comprising: a coagulating vessel to add a coagulant and magnetic particles to the waste water including the organic compounds so as to form a flock including the magnetic particles; a separating unit having a magnetic separator to magnetically separate the flock formed in the waste water and a rotating membrane filter for passing the waste water from a mixture of the waste water and flock; an adsorber filled with an adsorbent disposed downstream in a direction toward the waste water passed through the rotating membrane filter; and an electrolyzer having an anode and a cathode therein and a current being supplied between the anode and cathode so as to electrolyze water including an electrolyte and produce an electrolyte; wherein the electrolyte is supplied to the adsorbent in the adsorber from the electrolyzer so as to contact the electrolyte with the adsorbent adsorbed the organic compounds in the waste water, so that the organic compounds adsorbed by the adsorbent is desorbed or discomposed.

(9) To achieve the above object, the inventive bitumen collecting system comprising: a mill for milling mined oil sand; a bitumen extracting apparatus for extracting bitumen by supplying hot water to the milled oil sand; a purifying unit for purifying waste water discharged from the bitumen extracting apparatus; an organic compounds treatment apparatus for decomposing the organic compounds in the waste water purified by the purifying unit; and a piping system for supplying water resulting from the treatment by the organic compound treatment apparatus to the bitumen extracting apparatus.

According to the present invention, organic compounds included in waste water can be separated in a short time by using an adsorbent, and an electrolyte in an electrolyzer is circulated to reproduce the adsorbent, so the adsorbent does not need to be moved. Since salt is added to water only during reproduction, the amount of salt used is small and treated water includes little or no salt, thereby enabling the treated water to be discharged or recycled without additional treatment.

DETAILED DESCRIPTION OF THE PREFERRED EMBODIMENTS

Figure 1:
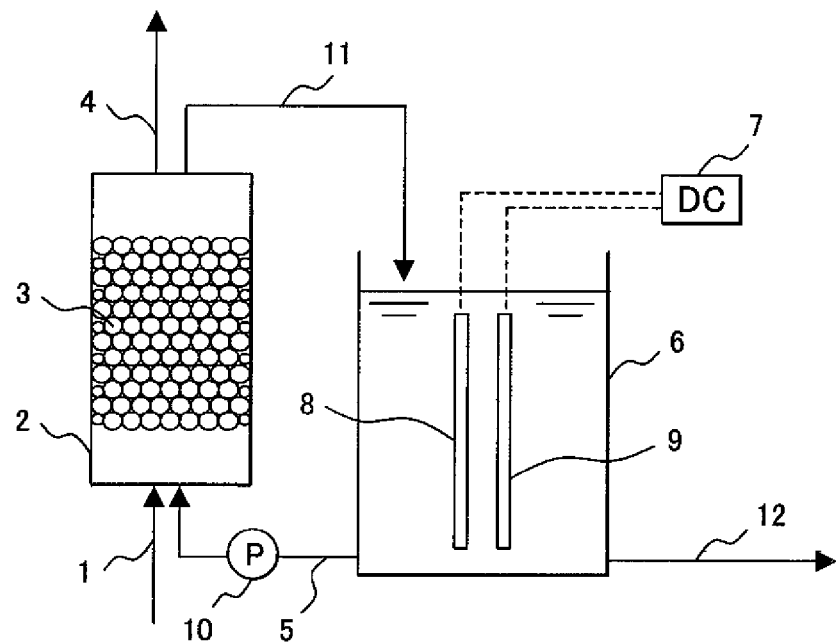
FIG. 1 is a drawing to show a schematic structure of a treatment apparatus for treating organic compounds included in waste water in a first embodiment of the present invention.

The principle of treatment in the present invention will be described before the best mode for carrying out the invention is described.

In the present invention, while waste water including organic compounds passes through an adsorbent layer filled with adsorbent particles, the organic compounds are adsorbed in the surfaces of the adsorbent particles. The adsorbent particle is, for example, granular, spherical, or columnar, or has a honeycomb structure or the like; there is no restriction on the shape of the adsorbent particle. When the concentration of the organic compounds in the water that has passed through the adsorbent layer is not higher than a relevant discharge criterion, the water can be discharged without additional treatment. When the water satisfies a relevant recycle criterion, the water can be recycled.

There is a maximum amount of organic compounds that an adsorbent can adsorb (maximum amount of adsorption). When the adsorbent reaches its saturation state, it can no longer adsorb the organic compounds. Accordingly, the adsorbent needs to be replaced with a new one or a reproduction process is required.

The maximum amount of adsorption depends on the material adsorbed and adsorption conditions; its value varies with the adsorbent.

In the present invention, an electrolyte produced by electrolysis is used to reproduce the adsorbent. When water in which an electrolyte (sodium chloride, for example) is dissolved is electrolyzed, if the resulting electrolyte is acidic or neutral, it is said that the following reactions occur, that is, chlorine gas, hypochlorous acid, or oxygen is generated from the anode, and hydrogen is generated from the cathode (Kanzaki, Electrochemistry, 73 (No. 11), 969 (2005)).

Anode: $2Cl^- + 2e \rightarrow Cl_2 (pH<3)$:::     (1)

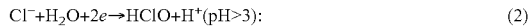

$Cl^- + H_2O + 2e \rightarrow HClO + H^+ (pH>3)$:     (2)

$H_2O \rightarrow 2H^+ + \frac{1}{2}O_2 + 2e$:::     (3)

Cathode: $2H^+ + 2e \rightarrow H_2$:::     (4)

The ease with which these reactions occur depends on the electrode material. For example, the oxygen overvoltage of platinum is high, so if platinum is used as the anode, production of chlorine or hypochlorous acid rather than oxygen first progresses. Since produced hypochlorous acid is highly oxidative, the organic compounds can be oxidized up to carbon dioxide.

It was considered that when the hypochlorous acid produced by electrolysis is brought into contact with the adsorbent that adsorbed the organic compounds, the organic compounds can be oxidized and thereby the adsorbent can be reproduced. Part of chlorine produced in formula (1) also dissolves in water, producing hypochlorous acid. In addition to hypochlorous acid, ozone, hydrogen peroxide, or activated oxygen may be produced as an oxidizing agent.

Accordingly, granular activated carbon was used as the adsorbent to have it adsorb acetic acid, which is one kind of organic acids. An electrolyzer having an anode and cathode made of platinum was prepared, in which electrolysis was carried out by using a sodium chloride solution as the electrolyte. While the electrolysis was in progress, the electrolyte was circulated through the adsorbent in which the acetic acids was adsorbed and changes of the concentration of the acetic acid in the electrolyte with time were observed. The concentration of the acetic acid was raised immediately after the circulation started and then lowered. A possible reason for this is that the rate at which the acetic acid is desorbed from the adsorbent at the contact with the electrolyte is higher than the rate of oxidization and decomposition, so the concentration of the acetic acid in the electrolyte is first raised, and that when the amount of acetic acid desorbed is decreased, the oxidization and decomposition of the acetic acid becomes dominant and the concentration of the acetic acid is lowered.

A reason why the organic compound is desorbed when the electrolyte is brought into contact with the adsorbent was considered.

In the electrolysis reactions, no hydrogen ion is produced in formula (1), but one hydrogen ion is produced per two electrons in formula (2). In a reaction on the cathode side according to formula (4), two hydrogen ions disappear per two electrons. That is, when reactions as in formulas (1) and (2) proceed on the anode and a reaction as in formula (4) proceeds on the cathode, hydrogen ions are consumed as a whole and thus the pH shifts toward alkalinity. This means that when nearly neutral water, in which sodium chloride is just dissolved, undergoes electrolysis, an alkaline electrolyte is obtained.

It could be thought that since the alkaline electrolyte was brought into contact with the adsorbent in which the organic compound was adsorbed, the organic compound was desorbed. Accordingly, it can also be thought that if an anode chamber and cathode chamber are separated by a diaphragm or ion exchange membrane and only the electrolyte in the cathode chamber is used, the alkalinity is increased and the organic compound can be desorbed more effectively. In addition, since the electrolyte is supplied while electrolysis is in progress, a temperature rise is caused due to an electric resistance of the electrolyte. This temperature rise can also enhance the desorbment of the organic compound.

As described above, in the present invention, an alkaline electrolyte and an oxidizing agent, such as hypochlorous, that are produced during electrolysis are used to desorb or decompose organic compounds adsorbed on an adsorbent. In the electrolysis, an anode and cathode are dipped in an electrolyte in which chloride, which becomes a raw material of the oxidizing agent, is added to improve the electric conductivity. A DC current is supplied between the anode and cathode. Since the electrolyte during electrolysis is brought into contact with the adsorbent, the organic compounds are removed from the adsorbent due to desorption or decomposition. The adsorbent can thus be used again to separate the organic compounds in the waste water by adsorption. The organic compound desorbed in the electrolyte is decomposed by the oxidizing agent produced during electrolysis, eliminating the need for post-treatment of the organic compound.

According to the present invention, the adsorbent is reproduced with alkali produced during the electrolysis, so alkali does not need to be bought. In addition, since the oxidizing agent produced during the electrolysis is used to oxidize and decompose the organic compounds, it is also possible to reuse the electrolyte after the decomposition process as alkaline water. Of course, the electrolyte can also be used as a neutralizing agent for acid.

First Embodiment

Next, a treatment apparatus of organic compounds included in waste water according to a first embodiment of the above mentioned present invention will be described. The treatment apparatus of organic compounds, shown in FIG. 1, in the first embodiment provides a supply pipe 1 for supplying the waste water including the organic compounds, an adsorber 2 which is filled with an adsorbent 3 such as activated carbon, a waste water discharging pipe 4, an electrolyzer 6 in which an electrolyte is supplied and a cathode 8 and an anode 9 are provided in the electrolyte, and a DC power supply 7 connected to the cathode 8 and anode 9.

An electrolyte supplying pipe 5 supplies the electrolyte from the electrolyzer 6 to the adsorber 2. A pump 10 is connected to the electrolyte supplying pipe 5. An electrolyte returning pipe 11 returns the electrolyte from the adsorber 2 to the electrolyzer 6. A drain pipe 12 is provided to use an alkaline solution in the electrolyzer 6. A piping system for cleaning the adsorbent 3 is not shown in the drawing.

In the above treatment apparatus of organic compounds according to the first embodiment, the organic compound is adsorbed by the adsorbent 3, an alkaline electrolyte and an oxidizing agent, such as hypochlorous acid, that are produced in electrolysis are used to desorb or decompose the organic compounds adsorbed on the adsorbent 3.

In the electrolysis, the anode 9 and cathode 8 are dipped in the electrolyte in the electrolyzer 6, in which chloride, which becomes a raw material of the oxidizing agent, is added to improve the electric conductivity. A DC current is supplied from the DC power supply 7 between the anode 9 and cathode 8.

Since the electrolyte during electrolysis is brought into contact with the adsorbent 3, the organic compounds are removed from the adsorbent 3 by desorption or decomposition. The adsorbent 3 can thus be used again to separate the organic compounds in the waste water by adsorption.

The organic compounds desorbed in the electrolyte are decomposed by the oxidizing agent produced during electrolysis, eliminating the need for post-treatment of the organic compounds. The adsorbent 3 is reproduced with the alkali produced during the electrolysis, so an alkali does not need to be bought. In addition, since the oxidizing agent produced during the electrolysis is used to oxidize and decompose the organic compound, it is also possible to reuse the electrolyte after the decomposition process as alkaline water. Of course, the electrolyte can also be used as a neutralizing agent for acid.

Test carried out with the treatment apparatus of organic compounds according to the first embodiment will be described.

In the first embodiment shown in FIG. 1, the adsorber 2, which has an inner diameter of 40 mm and a length of 200 mm and is made of glass, was internally filled with 50 ml (about 28 g) of activated carbon (Kuraray Coal kw10/32 from Kuraray Co., Ltd., with a particle diameter of 150 to 250 μm) as the adsorbent 3.

Simulated waste water including 10 g of acetic acid per litter was supplied from the bottom of the adsorber 2 through the supply pipe 1 toward the top at a space velocity (SV) of 19 $h^{-1}$ so as to have the adsorbent 3 adsorb the acetic acid included in the waste water at room temperature.

The concentration of acetic acid was measured at the exit of the adsorber 2. Almost no acetic acid was detected at an early time of the supply, indicating that the acetic acid was adsorbed by the adsorbent 3. When the simulated waste water was continued to be supplied for a while, the concentration of acetic acid began to rise. When about 400 ml of simulated waste water was supplied, the concentration of acetic acid became almost the same as the concentration at the inlet. This means that adsorption reached a saturated state.

The integrated concentrations of acetic acid and the integrated amount of simulated waste water supplied were obtained to obtain the amount of acetic acid adsorbed, which was 70 mg per gram of adsorbent.

Figure 2:
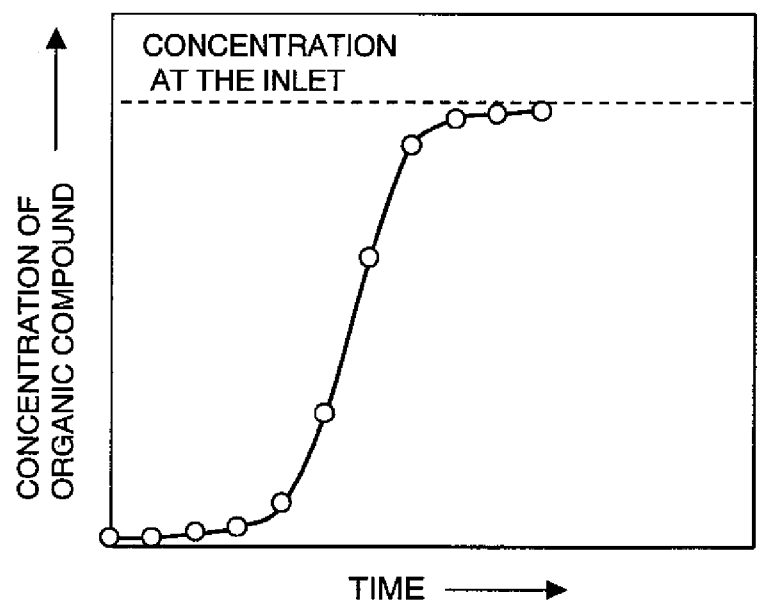
FIG. 2 is a drawing to show schematically changes in the concentration of the organic compounds at exit of an adsorber of the treatment apparatus in the embodiments of the present invention.

FIG. 2 schematically shows, in the above situation, changes in the concentration of the organic compound in the waste water at the exit of the adsorber 2. Water was discharged from the adsorber 2 through a discharge pipe 4 in this state.

Next, the anode 9 and cathode 8 are provided in the electrolyzer 6, which has a volume of 200 ml and is made of glass. Sodium chloride (NaCl) was dissolved in purified water to prepare an electrolyte with an NaCl concentration of 1.6 wt %, and the prepared electrolyte was supplied to the electrolyzer 6. The distance between the anode 9 and cathode 8, each of which measured 40 mm×40 mm with a thickness of 1 mm and was formed by coating a titanium substrate with platinum, was 5 mm. Electrolysis was then carried out at a current density of 125 $mA/cm^2$. While electrolysis was in progress, the electrolyte was supplied to the adsorber 2 at a rate of 16 ml/min. The temperature of the electrolyte at that time was about 30° C.

The electrolyte discharged from the adsorber 2 was circulated through an electrolyte supply pipe 5 and an electrolyte return pipe 11 disposed between the adsorber 2 and electrolyzer 6, so as to return the electrolyte to the electrolyzer 6. The initial pH of the electrolyte was 6.1. While the electrolysis proceeded, the pH shifted to alkalinity and the acetic acid concentration was raised.

Figure 3:
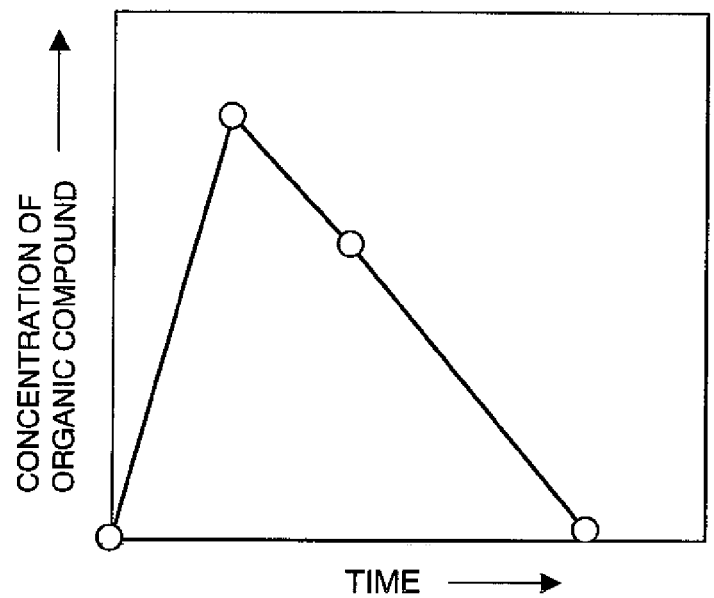
FIG. 3 is a drawing to show schematically changes in the concentration of the organic compounds when an electrolyte is circulated during reproduction in the treatment apparatus in the embodiments of the present invention.

That is, the acetic acid was removed from the adsorbent 3. The acetic acid concentration then began to drop and fell to 100 mg/liter or less 120 minutes later. The pH at that time was 13. FIG. 3 schematically shows, in the above situation, changes in the concentration of the organic compounds when the electrolyte was circulated.

Accordingly, it was through that when the electrolyte was circulated through the adsorbent 3 in which acetic acid was adsorbed, the acetic acid was removed from the adsorbent 3 and the removed acetic acid was oxidized and decomposed by hypochlorous acid, activated oxygen, or the like produced by the electrolyte. To confirm this, the adsorbent 3 was washed with dilute hydrochloric acid with a concentration of about 1% and then washed with water, after which simulated waste water including acetic acid with a concentration of 10 g/litter was flowed through the adsorber 2 again, and adsorption of acetic acid was checked. A result of the check indicated that acetic acid was adsorbed again.

The same test as in the first embodiment was carried out by using a treatment apparatus of organic compounds, which has the same structure as the above treatment apparatus of organic compounds shown in FIG. 1, in the first embodiment of the present invention; however, zeolite (H-ZSM-5 with a particle diameter of 1.5 mm, a length of 10 to 20 mm, and three $SiO_2/Al_2O_3$ ratios of 40, 90, and 190) was used as the adsorbent 3, instead of the activated carbon. The volume of the adsorbent 3 was 50 ml and the weight was 30 g.

A test result indicated that the amounts of acetic acid adsorbed by the zeolite with $SiO_2/Al_2O_3$ ratios of 40, 90, and 190 were respectively 42, 78, and 95 mg/g. It was confirmed as in the first example that the adsorbed acetic acid was removed, oxidized, and decomposed, after which acetic acid was adsorbed again.

An electrode formed by coating a titanium substrate with ruthenium oxide and iridium oxide was used as the anode 9 disposed in the electrolyzer 6 in the treatment apparatus of organic compounds, shown in FIG. 1, in the first embodiment of the present invention. The cathode 8 was the same as in the treatment apparatus of organic compound, shown in FIG. 1, in the first embodiment of the present invention.

In this example as well, it was confirmed that the adsorbed acetic acid was removed, oxidized, and decomposed.

Second Embodiment

Figure 4:
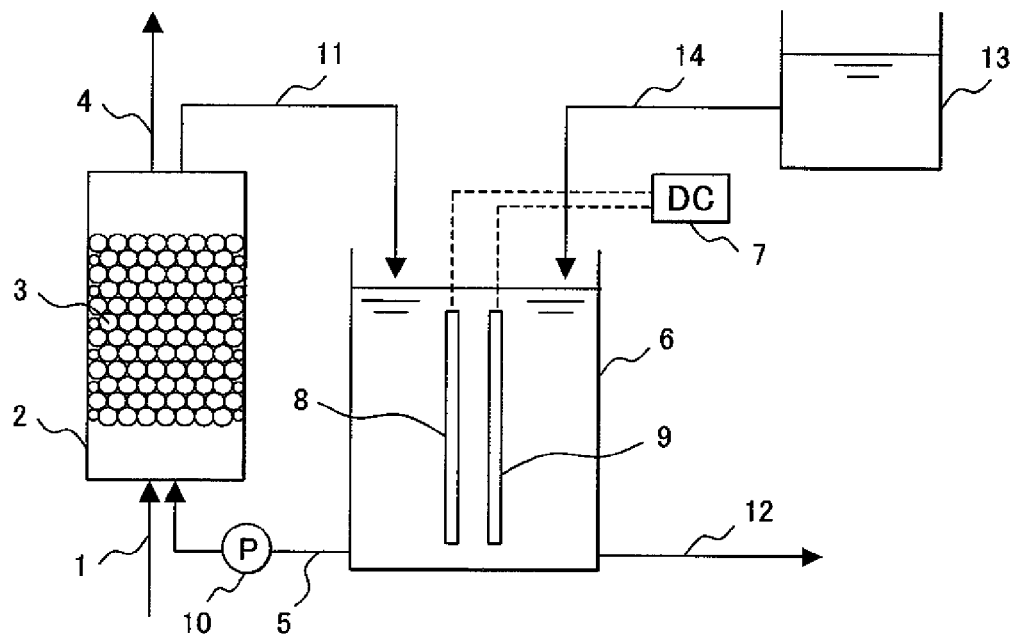
FIG. 4 is a drawing to show a schematic structure of a treatment apparatus for treating organic compounds included in waste water in a second embodiment of the present invention.

FIG. 4 shows a treatment apparatus of organic compounds included in waste water in a second embodiment of the present invention. In the second embodiment in FIG. 4, the same reference numerals as in the structure of the treatment apparatus of organic compounds, shown in FIG. 1, in the first embodiment indicate identical components, so their detailed explanation will be omitted.

In the second embodiment, a chemicals vessel 13 with a volume of, for example, 50 ml was added to the treatment apparatus of organic compounds, shown in FIG. 1, in first the embodiment of the present invention, so that a chemical agent consumed in the electrolyzer 6 can be replenished.

Third Embodiment

Figure 5:
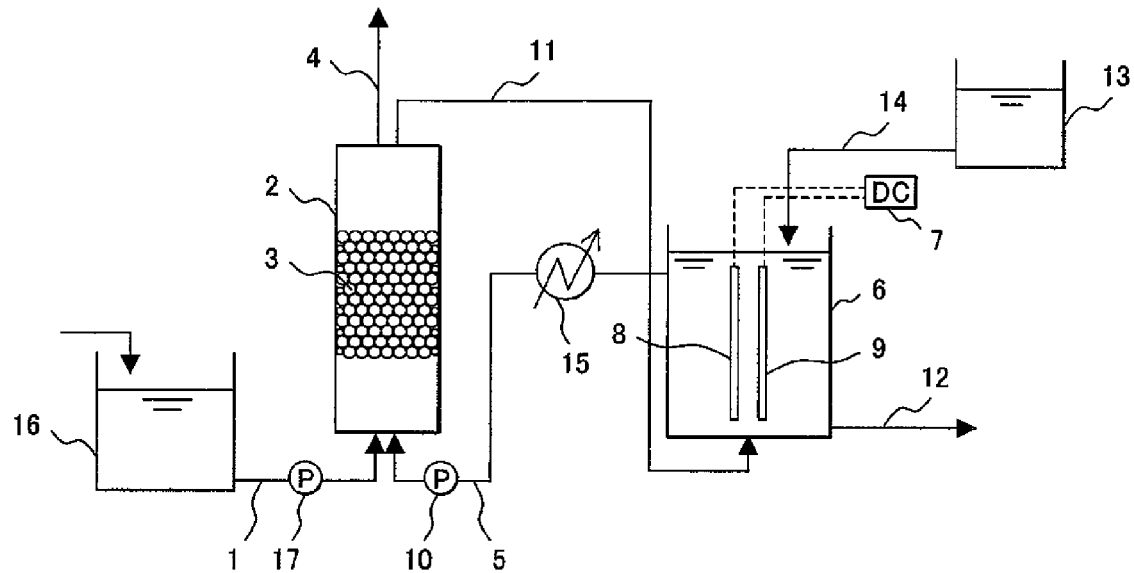
FIG. 5 is a drawing to show a schematic structure of a treatment apparatus for treating organic compounds included in waste water in a third embodiment of the present invention.

FIG. 5 illustrates how test was carried out using a treatment apparatus of organic compounds included in waste water in a third embodiment of the present invention. Potassium chloride (KCl) was used, instead of sodium chloride, as the chemical agent in the chemicals vessel 13 in the second embodiment. A 20 wt % KCl solution was supplied in the chemicals vessel 13.

The electrolyzer 6 was supplied only with water. The potassium chloride was supplied from the chemicals vessel 13 to the electrolyzer 6 before electrolysis so that its concentration became 1.0 wt %. The resulting solution was stirred with a stirrer (not shown) so that it became uniform, after which a current was supplied between the anode 9 and cathode 8. As a result, it was confirmed that the adsorbed acetic acid was removed, oxidized, and decomposed.

When components of the treatment apparatus of organic compounds, shown in FIG. 5, in the third embodiment, have the same reference numerals as in the structure of the treatment apparatus of organic compounds, shown in FIG. 4, in the second embodiment, these components are identical, so their detailed explanation will be omitted.

In the third embodiment, to structure an electrolyte circulating line between the electrolyzer 6 and the adsorber 2, a heat exchanger 15 was added to the electrolyte supplying pipe 5, which is the circulating line from the electrolyzer 6 to the adsorber 2, in the second embodiment shown in FIG. 4. A raw water vessel 16 to reserve the waste water is provided and the waste water in the raw water vessel 16 is supplied to the adsorber 2 through a pipe by a pump 17 provided in the pipe 1.

According to the third embodiment, when the electrolyte in the electrolyzer 6 is at a low temperature, the temperature can be raised by using the heat exchanger 15 to heat the electrolyte so as to promote the desorption of the organic compounds; when the temperature of the electrolyte is too high, the electrolyte can be cooled by the heat exchanger 15, enabling the treatment apparatus to be efficiently operated.

Fourth Embodiment

Figure 6:
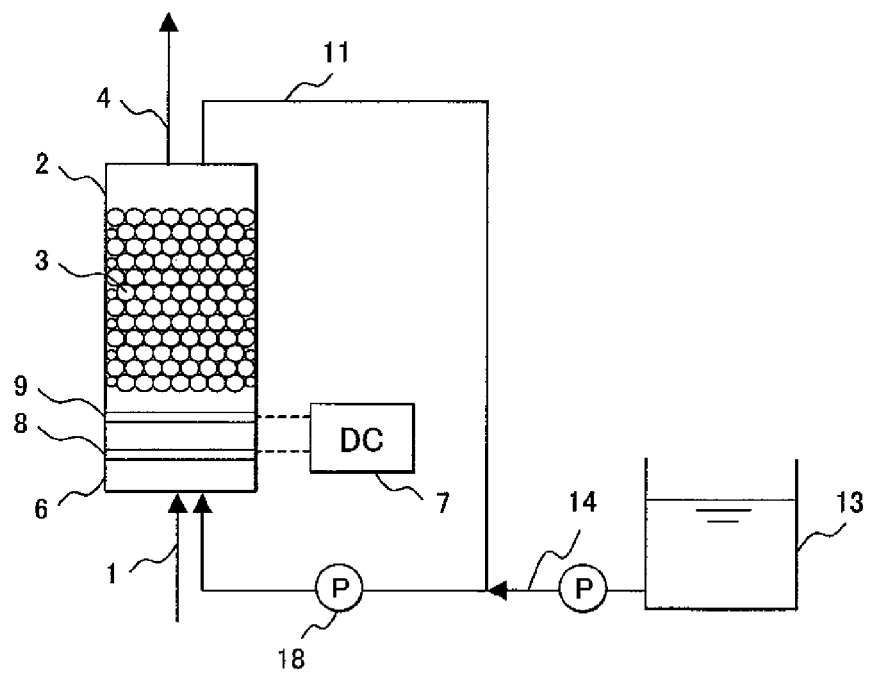
FIG. 6 is a drawing to show a schematic structure of a treatment apparatus for treating organic compounds included in waste water in a fourth embodiment of the present invention.

FIG. 6 shows a treatment apparatus of organic compounds included in waste water in a fourth embodiment of the present invention. In the fourth embodiment shown in FIG. 6, an experiment was carried out in the same way as with the treatment apparatus of organic compounds in waste water, shown in FIG. 4, in the second embodiment, except that the electrolyte was raised up to 60° C.; it was confirmed that the adsorbed acetic acid was removed, oxidized, and decomposed.

In the fourth embodiment shown in FIG. 6, the same reference numerals as in the structure of the second embodiment shown in FIG. 4 indicate identical or equivalent components, so their detailed explanation will be omitted.

In the fourth embodiment, the electrolyzer 6 is disposed within the adsorber 2 as another treatment method of organic compounds in waste water; specifically, the anode 9 and cathode 8 are disposed at the bottom of the adsorber 2 (supply side of waste water) so that they are orthogonal to the direction in which the waste water flows, and after electrolyte is supplied to the adsorber 2, a circulating pump 18 is started to circulate the electrolyte from the bottom of the adsorber 2 to the top.

In the fourth embodiment as well, the organic compounds included in the waste water can be reduced to less than a relevant discharge criterion, as in the other embodiments described above.

In test carried out with the treatment apparatus of organic compounds included in waste water in the fourth embodiment, shown in FIG. 6, the anode 9 and cathode 8 were internally disposed at the bottom of the adsorber 2, which has an inner diameter of 40 mm and a length of 200 mm and is made of glass.

The anode 9 and cathode 8 were both circular meshed electrodes with a diameter of 30 mm and a thickness of 1 mm, which were formed by coating a titanium substrate with platinum, the distance between the anode 9 and cathode 8 being 5 mm. 50 ml (about 28 g) of activated carbon (Kuraray Coal kw10/32 from Kuraray Co., Ltd. with a particle diameter of 150 to 250 μm) was filled as the adsorbent 3 above the anode 9 and cathode 8.

Simulated waste water including 10 g of acetic acid per litter was supplied from the bottom of the adsorber 2 toward the top at a space velocity of 19 $h^{-1}$ so as to have the adsorbent 3 adsorb the acetic acid included in the waste water. The concentration of acetic acid was measured at the exit of the adsorber 2; almost no acetic acid was detected at an early time of the supply, indicating that the acetic acid was adsorbed by the adsorbent 3.

When the simulated waste water was continued to be supplied for a while, the concentration of acetic acid gradually increased. When about 400 ml of simulated waste water was supplied, the concentration of acetic acid became almost the same as the concentration at the inlet. This means that adsorption reached a saturated state.

The integrated concentrations of acetic acid and the integrated amount of simulated waste water supplied were obtained to obtain the amount of acetic acid adsorbed, which was 70 mg per gram of adsorbent. In this state, the supply of the simulated waste water was stopped and the waste water in the adsorber 2 was discharged through a pipe (not shown).

The electrolyte with a NaCl concentration of 1.6 wt % stored in the chemicals vessel 13 was then supplied to the adsorber 2. After the adsorber 2 was filled with the electrolyte, the circulating pump 18 was started so that the electrolyte was circulated at a flow rate of 16 ml/min. A current with a current density of 250 $mA/cm^2$ (apparent area) was then supplied between the anode 9 and cathode 8 to cause electrolysis. The electrolyte shifted to alkalinity and the acetic acid concentration increased. The acetic acid concentration then began to drop and fell to 100 mg/liter or less 120 minutes later. The pH at that time was 13.

The electrolyte was then discharged and the simulated waste water including 10 g of acetic acid per liter was supplied to the adsorber 2 again and adsorption of acetic acid was checked. A result indicated that acetic acid was adsorbed again.

Fifth Embodiment

Figure 7:
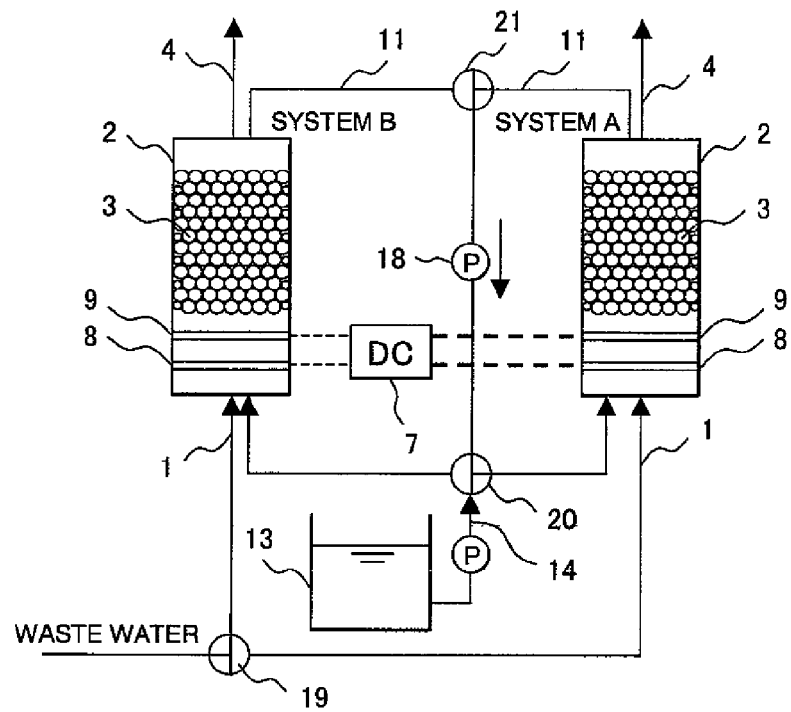
FIG. 7 is a drawing to show a schematic structure of a treatment apparatus for treating organic compounds included in waste water in a fifth embodiment of the present invention.

FIG. 7 shows a treatment apparatus of organic compound included in waste water in a fifth embodiment of the present invention. In the fifth embodiment shown in FIG. 7, the same reference numerals as in the structure of the fourth embodiment shown in FIG. 6 indicate identical or equivalent components, so their detailed explanation will be omitted.

In the fifth embodiment, the treatment apparatus of organic compound in waste water in the fourth embodiment of the present invention, shown in FIG. 6, was duplicated (systems A and B were provided side by side). While the adsorbent filled in the adsorber in one system is adsorbing organic compounds from the waste water, organic compounds adsorbed by the adsorbent in the adsorber in the other system is desorbed, oxidized, and decomposed by electrolyte, making it possible to continuously treat the waste water.

The conditions in the fifth embodiment shown in FIG. 7 were the same as the conditions for the treatment apparatus of organic compounds in the fourth embodiment shown in FIG. 6. First, a valve 19 for making a switchover of waste water supply was operated to switch over the flow of the waste water to the adsorber 2 in system B to have the adsorbent 3 filled in the adsorber adsorb acetic acid, after which the valve 19 was reversely operated to switch over the flow of the waste water back to the adsorber 2 in system A.

While acetic acid was being adsorbed by the adsorbent 3 filled in the adsorber 2 in system B, the waste water was discharged from the adsorber 2 in system A, and valves 20 and 21 were operated to supply a 1.6-wt % NaCl solution included in the chemicals vessel 13 to the adsorbent 3 filled in the adsorber 2 in system A, after which the circulating pump 18 was started to circulate the electrolyte. A current was then supplied between the anode 9 and cathode 8. After the current supply was continued for a fixed length of time, the electrolyte was discharged from the adsorber 2 in system B and the supply of the waste water was switched over to the adsorber 2 in system A.

In this embodiment, treatment of the waste water is carried out continuously; while the adsorbent 3 in one adsorber 2 is reproduced, the waste water is supplied to another adsorber 2 and treated.

A case in which two adsorbers 2 are provided will be described below. The treatment begins by operating the valve 19 to supply the waste water to one adsorber 2 to have the one adsorbent 3 filled in the adsorber 2 adsorb the organic compounds.

When the concentration of the organic compound is measured at the exit of the one adsorber 2 by using an organic compound concentration meter (not shown), the concentration is nearly 0 at an early time; as the amount of adsorbent increases, the concentration of the organic compound at the exit increases.

If the concentration at the exit of the one adsorber 2 reaches a prescribed concentration, which is determined according to a relevant discharge criterion and recycling criterion, when the valve 19 is reversely operated, the destination to which to supply the waste water is switched over to the other adsorber 2; the adsorption of the organic compounds in the waste water is continued by the adsorbent 3 filled in the other adsorber 2. A reproduction process is carried out for the one adsorber 2 including the adsorbent 3 by which the organic compound in the waste water has been adsorbed first.

To reproduce the adsorbent 3 filled in the adsorber 2, the electrolyte in the electrolyzer 6 as shown in FIG. 1 is supplied to the adsorbent 3 filled in the adsorber 2 by circulating the electrolyte. The state of the reproduction process can be known by measuring the concentration of the organic compounds in the electrolyte.

As described before, when the organic compound is desorbed from the adsorbent 3, the concentration of the organic compound in the electrolyte increases tentatively, after which the organic compound is oxidized and its concentration starts to decrease. The reproduction of the adsorbent 3 in the adsorber 2 is completed at a point in time when the concentration of the organic compounds sufficiently decreases, and the electrolyte is stopped from circulating.

The adsorber 2 is filled with the electrolyte, which is alkaline, at that time, so the alkaline solution is discharged and the filled adsorbent 3 is washed, as necessary.

The adsorbent 3 is washed with acid or water. Since the organic compound has been removed with an alkaline solution, it is preferable to first wash the adsorbent 3 with acid and then wash it with water. The reproduced adsorbent 3 can thereby adsorb more organic compound.

To measure the concentration of the organic compounds, total organic carbon (TOC), chemical oxygen demand (COD), absorbance, and indirect methods such as electrical conductivity, pH, and other physical quantities may be used instead. If variations in the organic compound concentration are small, it is also possible to operate the apparatus using the amount of waste water that has passed through the adsorbent 3.

Sixth Embodiment

Figure 8:
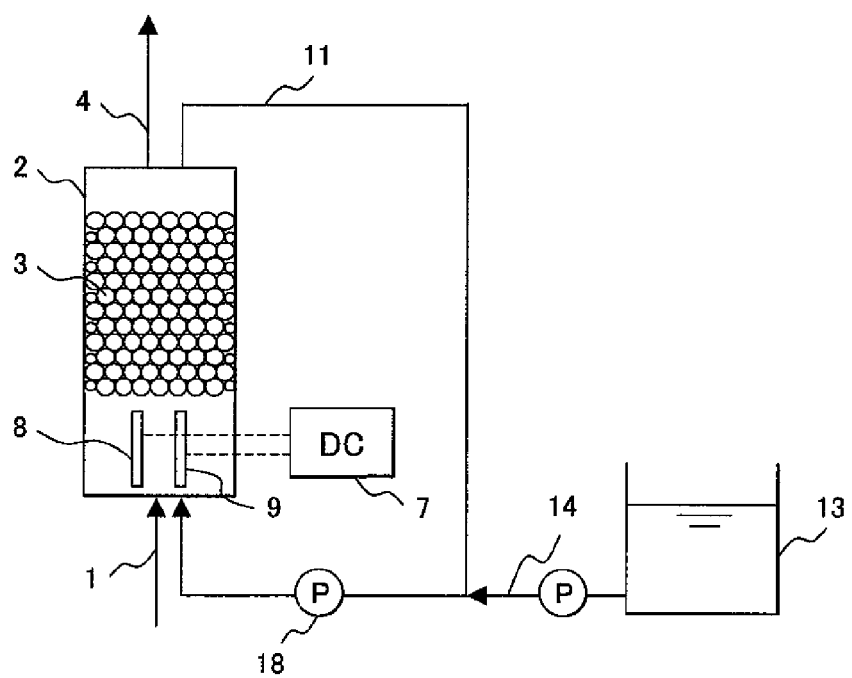
FIG. 8 is a drawing to show a schematic structure of a treatment apparatus for treating organic compounds included in waste water in a sixth embodiment of the present invention.

FIG. 8 shows a treatment apparatus of organic compounds included in waste water in a sixth embodiment of the present invention. In the sixth embodiment shown in FIG. 8, the same reference numerals as in the structure of the fourth embodiment shown in FIG. 6 indicate identical or equivalent components, so their detailed explanation will be omitted.

In the sixth embodiment, the anode 9 and cathode 8, which are disposed inside the adsorber 2 and at its lower part, are oriented parallel to the direction in which the waste water flows.

In the sixth embodiment, an experiment was performed under the same conditions as in the fourth embodiment shown in FIG. 6; results obtained were similar to the results in the fourth embodiment.

Seventh Embodiment

Figure 9:
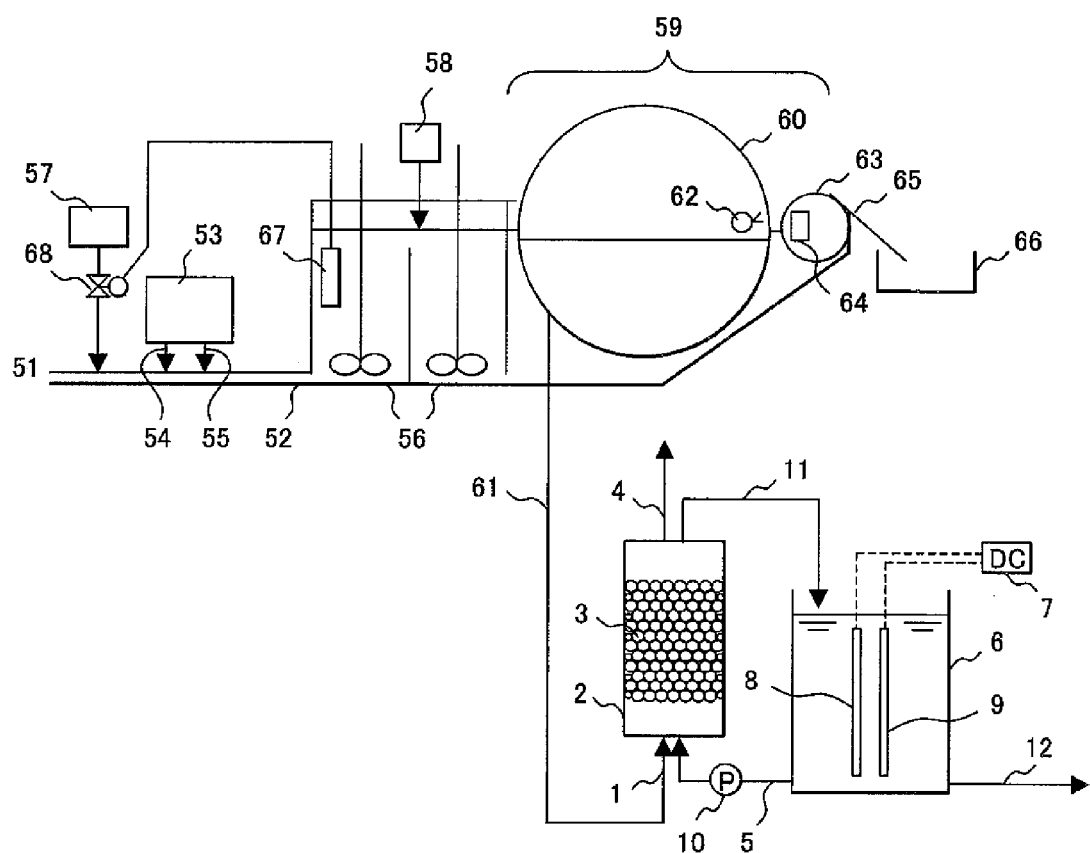
FIG. 9 is a drawing to show a treatment system for treating organic compounds included in waste water in a seventh embodiment of the present invention.

FIG. 9 shows a treatment system of organic compounds included in waste water in a seventh embodiment of the present invention. In the treatment system of organic compounds, shown in FIG. 9, in the seventh embodiment, the same reference numerals as in the structure of the treatment apparatus of organic compound included in waste, shown in FIG. 1, in the first embodiment indicate identical or equivalent components, so their detailed explanation will be omitted.

In the treatment system of organic compound in the seventh embodiment, the adsorber 2 and electrolyzer 6 are disposed downstream of an oil-water separator.

The oil-water separator in the seventh embodiment shown in FIG. 9 comprises a coagulant vessel 56, a rotating drum 63, and a separation unit 59; in the coagulant vessel 56, a coagulant 55 and magnetic particles 54 are added from a chemicals feed unit 53 to treated raw water 51 so as to form an oil content into a flock; the rotating drum 63 provides a magnetic field generator 64 that magnetically separates the formed flock including the magnetic particle 54; the separation unit 59 provides a rotating membrane filter 60; organic compounds having large solubility to water, such as organic acids, remains in waste water that passes through the rotating membrane filter 60 and is discharged.

The organic compounds in this waste water are separated by being adsorbed by the adsorbent 3 in the adsorber 2 disposed downstream of the water-oil separator, and the adsorbent 3 in which the organic compounds are adsorbed is reproduced by using an electrolyte in the electrolyzer 6. In the seventh embodiment, while treated raw water 51 including oil (which is yielded from an oil field and referred to as raw water) is flowing in a pipe 52 from which the raw water is supplied to the coagulant vessel 56, the magnetic particles 54 and coagulant 55 are added from the chemicals feed unit 53 to the raw water.

The coagulant 55 is preferably salt of iron or aluminum, such as ferric sulfate, ferrous chloride, poly aluminum chloride, or the like. A suitable magnetic particles are ferromagnetic material, for example, magnetite ($Fe_3O_4$) and γ hematite ($Fe_2O_3$).

Oil emulsion particles, solid compound suspended in water, added magnetic particles, and the like are coagulated by the coagulant 55 in the coagulant vessel 56, forming many flocks. When the pH is adjusted to a suitable value by a pH adjustment 57 such as sodium hydrate, the power of coagulation can be increased.

Supply of the pH adjustment 57 can be adjusted by using, for example, a pH detector 67 disposed in the coagulant vessel 56 and a valve 68 that controls the amount of supply of the pH adjustment 57 according to a detection signal from the pH detector 67.

When an auxiliary coagulant 58 such as anion macromolecular polymer is supplied into the coagulant vessel 56, the flock can be enlarged and consolidated.

The separation unit 59 provides a rotating membrane filter 60 by which the water including many flocks are filtered out; resulting filtered water 61 (referred to below as intermediate water) can be flowed from the rotating membrane filter 60. When efficiency of flock removal is considered, preferable mesh sizes of the rotating membrane filter 60 are 10 to 50 μm.

Flocks, which include the magnetic particle 54 and are accumulated on the surface of the rotating membrane filter 60, are removed by water jetted from a washing unit 62 disposed in the rotating membrane filter 60, and drop near a rotating drum 63. The rotating drum 63 internally provides a magnetic field generator 64 that uses a permanent magnet, superconducting bulk magnet, or electromagnet; the flocks including the magnetic particles 54 are attracted by a magnetic force of the magnetic field generator 64, removed by a sludge recovery plate 65 along the surface of the rotating drum 63, and collected and stored in a sludge vessel 66.

Since the sludge recovery plate 65 removes the flocks in the atmosphere rather than in water, moisture drops downward to some extent, resulting in oil sludge with a low percentage of moisture content.

Accordingly, a cost for disposing of the sludge can be reduced. In some cases, the sludge can be burnt by adding little or no new fuel. Many flocks float in the water because they mainly include oil and thereby have a low specific gravity. However, some flocks may have a high specific gravity depending on the effect by solid substances in the water and the amount of coagulant, and thus may settle in the water. In this case, it is difficult to separate the sludge from the water with high efficiency by utilizing a difference in specific gravity. By contrast, a magnetic force enables highly efficient removal.

Although an example of separation by using a combination of a rotating membrane filter and a magnetic force has been described in this embodiment, the use of another separation method, such as a chemical clarification method or a coagulation and floatation method, also enables the present invention to provide the same effect.

Although the oil content and suspended substances included in the intermediate water 61 obtained in the separation unit 59 were substantially reduced, very fine micro organic particles and ionized substances originally included in the raw water 51, which are so-called soluble COD components, were included in the intermediate water 61 by a chemical oxygen demand (CODMn) value of about 350 mg/liter. The intermediate water 61 was supplied to the adsorber 2 and treated in the same way as in the first example. In this case, the concentration of organic compounds was evaluated with CODMn. The result was the same as in the first example. Since almost all oil contents and suspended substances are removed in advance with coagulation and separation, there is no risk that the surface of the adsorbent 3 is deteriorated.

In the embodiments of the present invention described above, it is possible to treat waste water that includes organic acids such as formic acid, acetic acid, propionic acid, butyric acid, or valeric acid as the main organic compounds to be treated, and also includes other organic compound, such as lactic acid, glycol, succinic acid, and methanol.

Activated carbon (referred to as coal activated carbon or coconut shell activated carbon depending on the raw material), which is a hydrophobic adsorbent, can be used as the adsorbent 3. Many types of activated carbons having different pore distributions and different hydrophobic properties are available. Activated carbon suitable to the type of organic compounds to be treated should be selectively used. Activated carbon also differs in shape and size; for example, it may be granular or spherical. Activated carbon suitable to the process should be selectively used.

Zeolite can also be used as an adsorbent other than activated carbon. Zeolite is classified as natural zeolite, synthesized zeolite, or artificial zeolite according to the manufacturing method and raw material. Many types of zeolites having different structures and different $SiO_2/Al_2O_3$ ratios are known. They can also be classified into the Na type, H type, and the like according to the type of the ion in the skeleton. Zeolite is classified as ZSM-5, mordenite, L type, ferrierite, or Y type and the like according to the structure. The pore diameter ranges from 0.4 to 1.0 nm, depending on the zeolite type. An optimum material should be selected according to the size of the molecule to be treated. The hydrophobic property changes depending on the $SiO_2/Al_2O_3$ ratio; it is said that as the $SiO_2/Al_2O_3$ ratio increases, the hydrophobic property is enhanced. Accordingly, when water-soluble organic compound such as organic acids are adsorbed, zeolite having a large $SiO_2/Al_2O_3$ ratio should be used.

The adsorbent 3 can be formed in granular, spherical, or columnar shape and filled in the adsorber 2. Alternatively, the adsorbent 3 can be molded in honeycomb shape or can be formed by coating a honeycomb substrate with an adhesive.

As for the electrodes used for electrolysis, a reaction indicated by formula (1) or reactions indicated by formulas (2)

and (3) proceed at the anode 9, as described above. In the description below, the pH is assumed to be 3 or more. How much hypochlorous acid, which is an oxidizing agent, is produced varies depending on which of formula (2) or formula (3) is dominant. If the reaction indicated by formula (2) mainly proceeds, hypochlorous acid is mainly produced, and the pH of the electrolyte shifts to alkalinity. This result is preferable for the process.

Accordingly, in the present invention, platinum, ruthenium, iridium, palladium, or rhodium can be used alone or in combination to form the anode 9, or its alloy can also be used. Alternatively, a layer of platinum, ruthenium, iridium, palladium, or rhodium alone or in combination or its alloy can be formed on a substrate made of, for example, titanium. When a diamond electrode, for which an overvoltage to produce oxygen is high, is used, hypochlorous acid is produced efficiently. In addition, it is also possible to directly oxidize and decompose the organic acids.

The cathode 8 is enough if it produces hydrogen efficiently and is a stable material. As with the anode 9, the cathode 8 may be made of platinum or iridium. Within a range from neutrality to alkalinity, the cathode 8 may be made of iron or nickel. An electrode coated on a substrate can also be used.

The anode 9 and cathode 8 each may be a plate-like or mesh-like electrode. A diaphragm or ion exchange membrane may be provided between the anode 9 and cathode 8. In this case, however, the electrolyte in the cathode chamber is used for desorption and the electrolyte in the anode chamber is used for oxidization and decomposition, so as to reproduce the adsorbent. When the electrolysers are stacked, a unipolar system or a bipolar system is applicable.

The electrolyte needs to include chloride because hypochlorous acid produced from electrolysis is used as the main oxidizing agent. The electrolyte also has to fulfill the role of increasing the electric conductivity to reduce the solution resistance. Therefore, sodium chloride or potassium chloride is added. The amount of addition is preferably 0.5 to 3 wt % and more preferably 1 to 2 wt %. When water including chloride is used, the amount of addition may be reduced or the need to add chloride may be eliminated.

Next, embodiments in which the treatment apparatus of organic compounds included in waste water, described in the first embodiment above, is applied to production of bitumen from oil sand will be described with reference to FIGS. 10 to 17.

In Canada, oil sand is dug to produce bitumen. Oil sand is a mixture of sand, clay, and bitumen, which is black, clay, asphalt-like hydrocarbon. Bitumen is mainly produced by surface mining at present.

A bitumen collecting system based on surface mining will be described first as a comparative example, with reference to FIG. 10.

Figure 10:
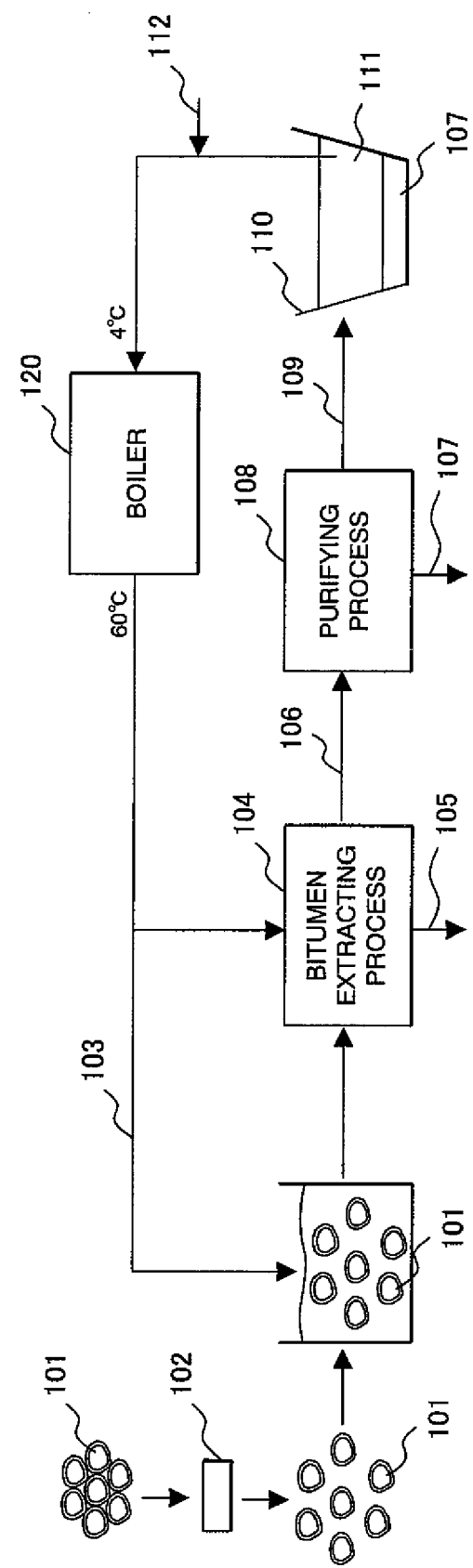
FIG. 10 is a drawing to show the general structure of a bitumen collecting system, based on surface mining, in a comparative example.

In the comparative example in FIG. 10, mined oil sand 101 is milled by a mill 102 and then transferred to a bitumen extracting process 104 by using hot water 103. The hot water 103 is also used to extract bitumen 105 in the bitumen extracting process 104.

The hot water 103 used to extract the bitumen 105 becomes waste water 106. The waste water 106 includes suspended solids (SS), which are materials suspended in water, remaining oil, and COD components.

Part of the SS and remaining oil are purified in a purifying process 108, but waste water 109 including SS and remaining oil 107, which have not been treated, is transferred to a water reservoir 110. The SS and remaining oil 107 are made to settle in the water reservoir 110 by taking a time.

Much water is used to collect bitumen. Supernatant fluid 111 in the water stored in the water reservoir 110 is pumped and sent to a boiler 120, in which the supernatant fluid 111 is heated and used as the hot water 103. However, the COD components do not settle and are left in the supernatant fluid 111, so river water 112 is used to lower the concentration of the COD components included in water to be supplied to the boiler 120.

Since much water is necessary to collect bitumen as described above, the method in the comparative example is significantly problematic in that an environment is destructed due to an enlarged artificial water reservoir and a river from which water is taken is exhausted.

Eighth Embodiment

A bitumen collecting system in an eighth embodiment of the present invention will be described with reference to FIG. 11.

Figure 11:
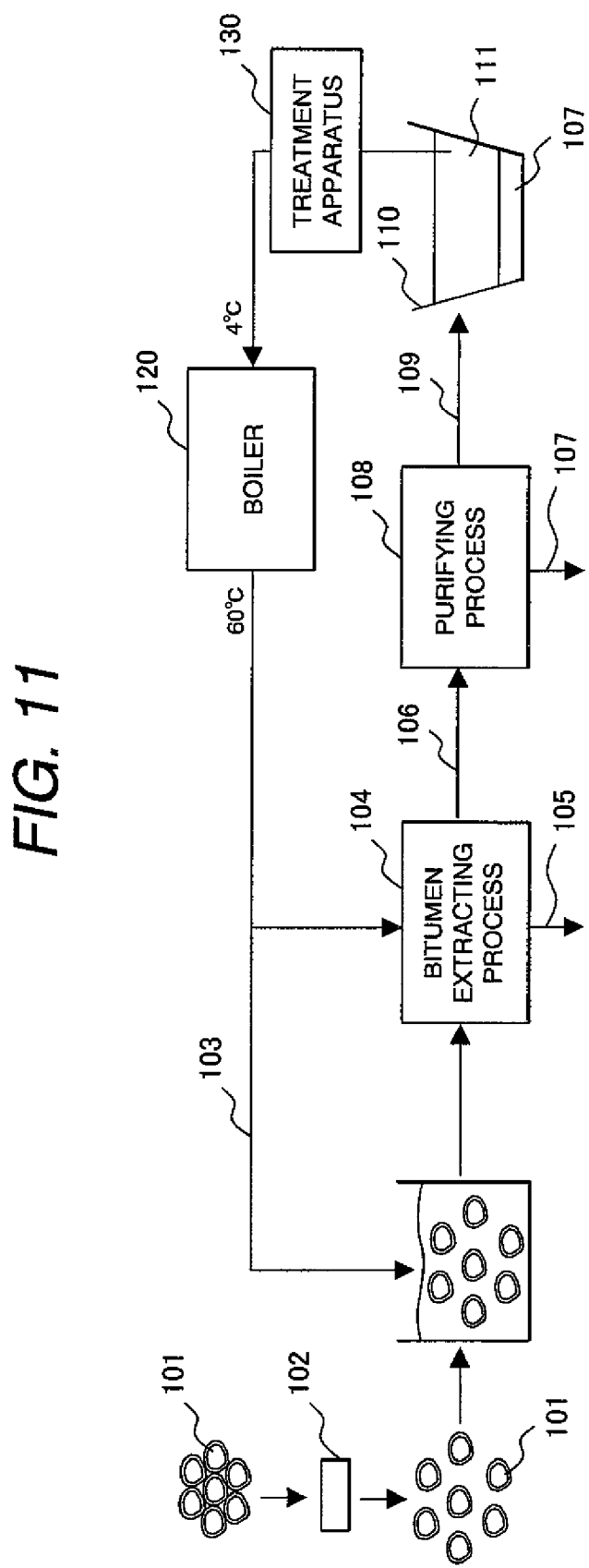
FIG. 11 is a drawing to show a schematic structure of a bitumen collecting system in an eighth embodiment of the present invention.

The bitumen collecting system, shown in FIG. 11, in the eighth embodiment collects bitumen by surface mining. In the bitumen collecting system in the eighth embodiment, the same reference numerals as in the structure of the bitumen collecting system in the comparative example shown in FIG. 10 indicate identical or equivalent components, so their detailed explanation will be omitted.

In the bitumen collecting system, shown in FIG. 11, in the eighth embodiment, the supernatant fluid 111 in the water reservoir 110 is supplied to a treatment apparatus 130 of organic compounds shown in FIG. 1, and water produced by the treatment apparatus 130 is delivered to a boiler 120.

Since the treatment apparatus 130 of organic compounds is located downstream of the water reservoir 110, the COD components in the supernatant fluid 111 in the water reservoir 110 can be decomposed and removed. Accordingly, it is possible to stop or reduce the supply of the river water 112, reducing a load to the environment.

Ninth Embodiment

A bitumen collecting system in a ninth embodiment of the present invention will be described with reference to FIG. 12.

Figure 12:
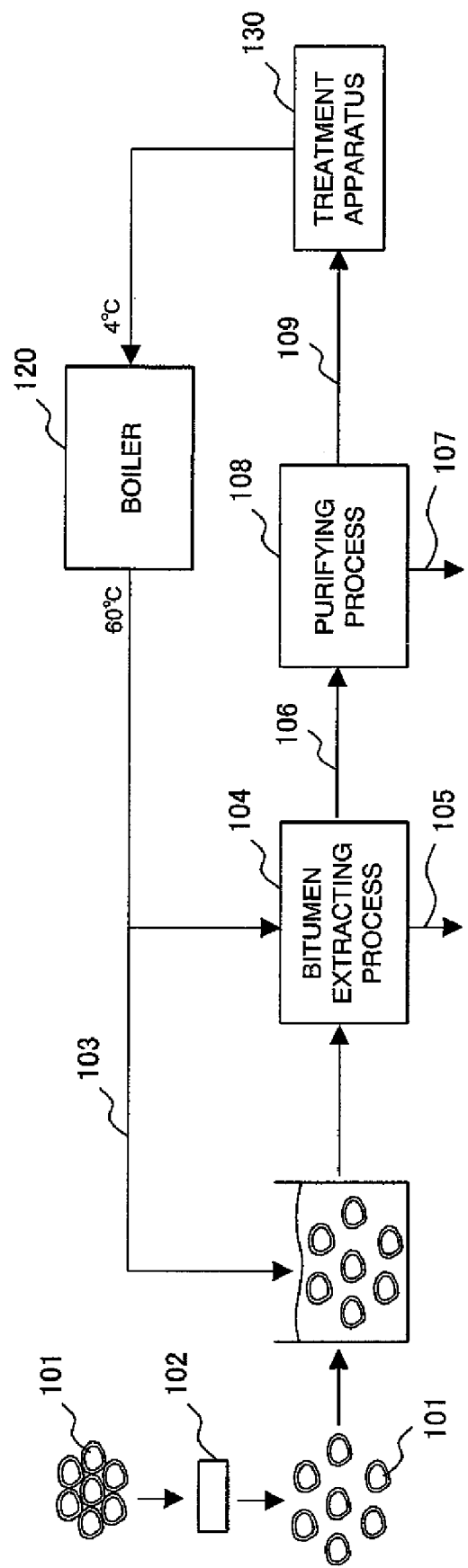
FIG. 12 is a drawing to show a schematic structure of a bitumen collecting system in a ninth embodiment of the present invention.

The bitumen collecting system, shown in FIG. 12, in the ninth embodiment of the present invention is identical to the bitumen collecting system, shown in FIG. 11, in the eighth embodiment except that the water reservoir 110 is not used.

In the bitumen collecting system, shown in FIG. 12, in the ninth embodiment, the purifying process 108 that can treat the SS in the waste water 106 and the remaining oil at a high level is combined, so the waste water 109 can be supplied directly from the purifying process 108 to the treatment apparatus 130 of organic compounds, without the water reservoir 110 being provided.

Water produced by the treatment apparatus 130 is then supplied to the boiler 120. Since the water reservoir 110 is eliminated, environment destruction can be suppressed.

Tenth Embodiment

A bitumen collecting system in a tenth embodiment of the present invention will be described with reference to FIG. 13.

Figure 13:
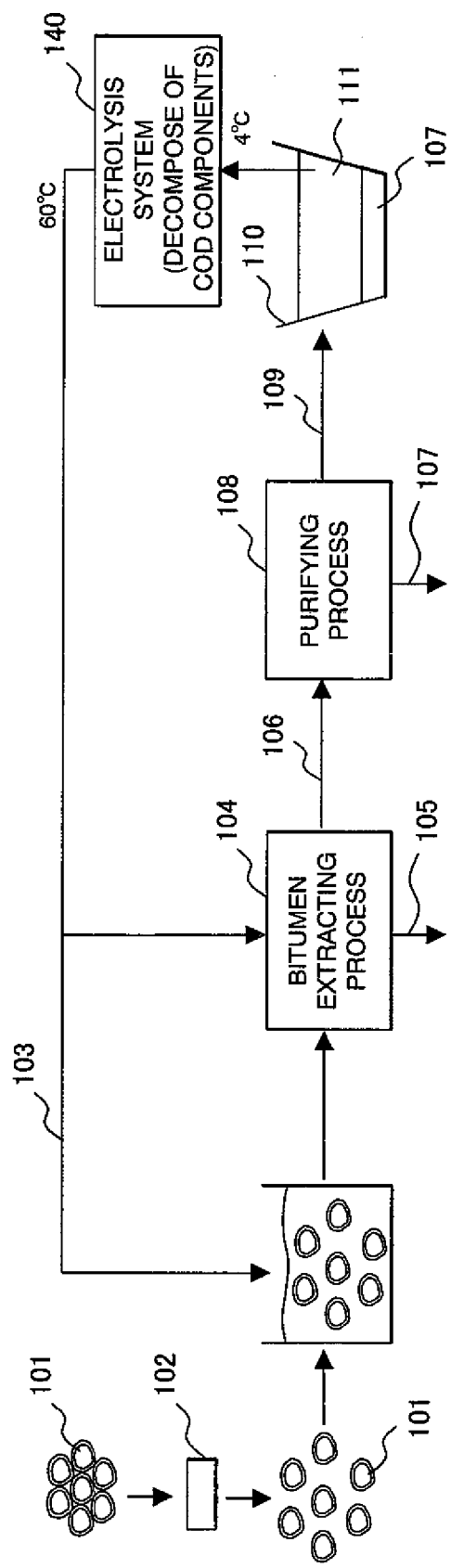
FIG. 13 is a drawing to show a schematic structure of a bitumen collecting system in a tenth embodiment of the present invention.

The bitumen collecting system, shown in FIG. 13, in the tenth embodiment of the present invention is identical to the bitumen collecting system, shown in FIG. 11, in the eighth embodiment except that the boiler 120 is not used.

In oil sand processing in which much hot water is used, cold water is heated by the boiler 120 to make hot water used for bitumen production, consuming much energy.

Although the treatment apparatus of organic compound shown in FIG. 1 includes an adsorber 2 filled with an adsorbent 3, the waste water including COD components can also be decomposed just by passing the waste water through the electrolyzer 6, without passing the waste water through the adsorber 2.

In the bitumen collecting system, shown in FIG. 13, in the tenth embodiment, the supernatant fluid 111 passes through the electrolyzer 6 in an electrolysis system (Decompose of COD components) 140 Decompose of COD components downstream of the water reservoir 110, enabling the boiler 120 to be eliminated.

The supernatant fluid 111 in the water reservoir 110 is supplied to the electrolysis system 140 without being passed through the adsorber 2 so as to directly perform electrolysis for the supernatant fluid 111 and decompose the COD components.

The treatment water, which is heated by the electrolysis system 140, is then supplied as the hot water 103. A cost involved in hot water production by the boiler 120 can thereby be cut. The bitumen collecting system in this embodiment achieves both waste water treatment and reduction in energy cost expended for hot water production.

Eleventh Embodiment

A bitumen collecting system in an eleventh embodiment of the present invention will be described with reference to FIG. 14.

Figure 14:
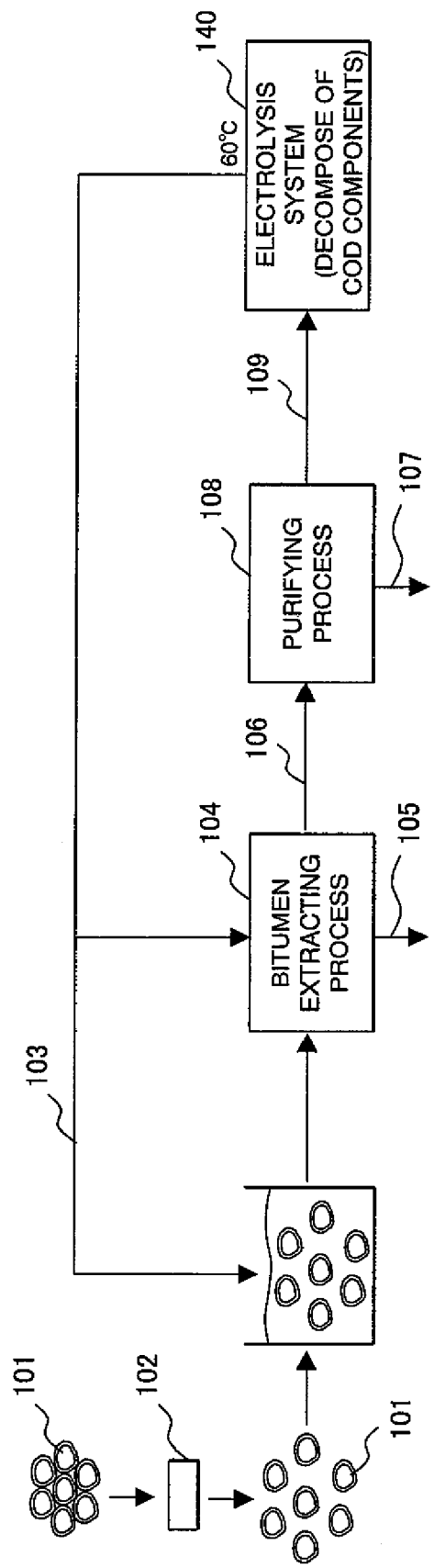
FIG. 14 is a drawing to show a schematic structure of a bitumen collecting system in an eleventh embodiment of the present invention.

The bitumen collecting system, shown in FIG. 14, in the eleventh embodiment of the present invention is identical to the bitumen collecting system, shown in FIG. 11, in the eighth embodiment except that the boiler 120 is not used.

In the bitumen collecting system, shown in FIG. 14, the purifying process 108 that can treat the SS in the waste water 106 and the remaining oil at a high level is combined to eliminate the need to use the water reservoir 110, as with the bitumen collecting system shown in FIG. 12.

The waste water 109 including COD components from the purifying process 108 for purifying SS and remaining oil can also be decomposed just by passing the waste water through the electrolyzer 6, without passing the waste water through the adsorber 2, so the waste water is supplied to the electrolyzer 6 in the electrolysis system 140 so as to directly perform electrolysis and decompose the COD components. The treatment water heated by the electrolysis system 140 is supplied as hot water.

The bitumen collecting system, which can cut the cost in hot water production by the boiler 120, is a treatment system that achieves both waste water treatment and reduction in energy cost expended for hot water production.

As with the bitumen collecting system shown in FIG. 13, the waste water can be directly supplied without having to provide the water reservoir 110, so the water reservoir 110, which is artificial, can be eliminated and thus environment destruction can be suppressed.

A biological treatment method is also available as the waste water treatment method. In oil sand areas, where the temperature is −40° C. in winter, in Canada, however, an effect by activities of living beings is reduced and efficient treatment cannot be expected. By contrast, the above bitumen collecting systems can maintain their performance without being affected by climatic conditions.

In addition to surface mining, the steam assisted gravity drainage (SAGD) method is available as a bitumen production method.

Figure 15:
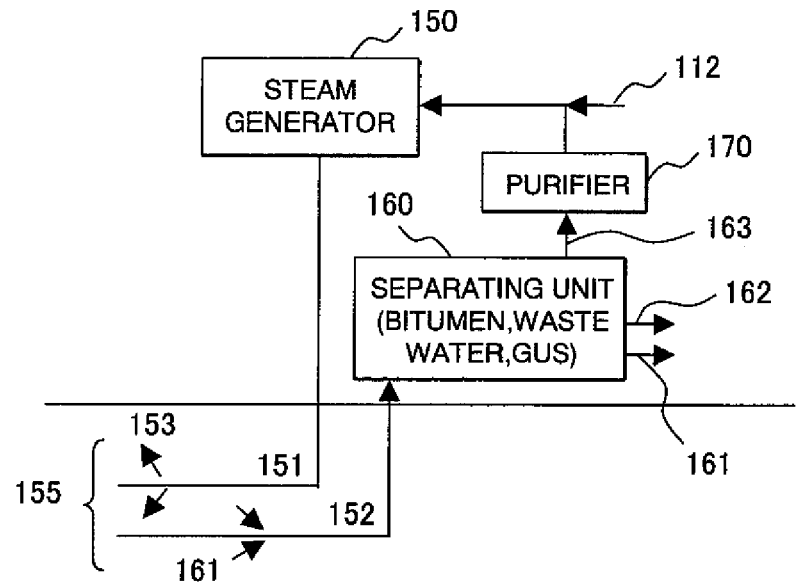
FIG. 15 is a drawing to show the general structure of a bitumen collecting system, based on the SAGD method, in a comparative example.

A comparative example of a bitumen collecting method based on the SAGD method will be described below. In the SAGD method, steam is used to lower the viscosity of bitumen before it is collected. FIG. 15 shows a bitumen collecting system, which is based on the SAGD method, in a second comparative example.

As shown in FIG. 15, two horizontal wells 151 and 152, separated vertically, are dipped in an oil sand layer 155. Steam 153 is supplied under pressure from the upper well 151 to melt bitumen 161. The molten bitumen 161 is collected through the lower horizontal well 152.

The collected bitumen 161 includes waste water 163 and gas 162, which are separated by a separating unit 160. The waste water 163 is purified by a purifier 170 and recycled.

When the recycling of the waste water 163 is incomplete, river water 112 is drawn and used.

To produce one barrel of bitumen 161, the amount of water used is three times as much as the amount of bitumen. The use of a large amount of water results in environment destruction, exhaustion of the river from which to draw water, and other environmental loads. To reduce the environmental loads, it is preferable to recycle the waste water 163. However, as the recycle ratio is increased, more COD components in the waste water are condensed. Since steam is used in the SAGD method, a high concentration of COD components in the waste water increases damage to equipment.

Twelfth Embodiment

Figure 16:
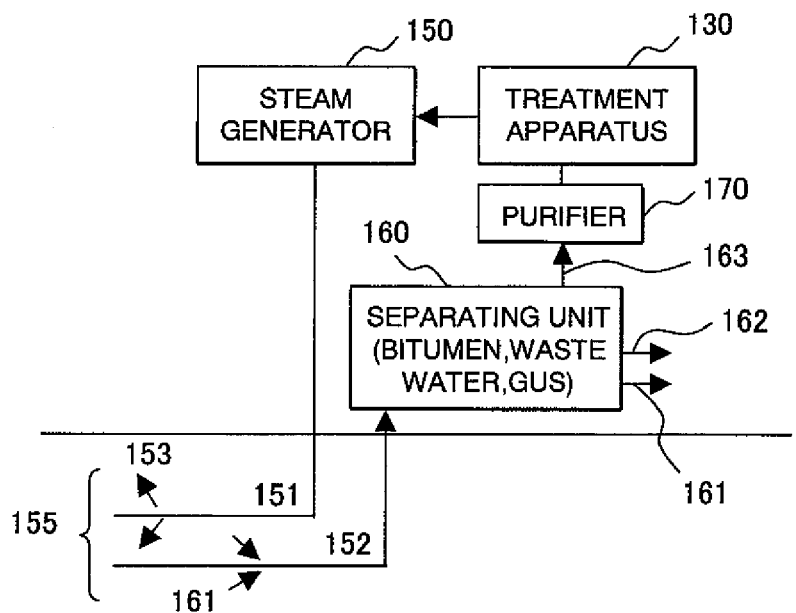
FIG. 16 is a drawing to show a schematic structure of a bitumen collecting system in a twelfth embodiment of the present invention.

A bitumen collecting system, based on the SAGD method, in a twelfth embodiment of the present invention will be described. FIG. 16 shows the bitumen collecting system, based on the SAGD method, in the twelfth embodiment. In the bitumen collecting system in the twelfth embodiment, the same reference numerals as in the structure of the bitumen collecting system in the comparative example shown in FIG. 15 indicate identical or equivalent components, so their detailed explanation will be omitted.

In the bitumen collecting system, shown in FIG. 16, in the twelfth embodiment, the treated water resulting from the purification by a purifying unit 170 in the bitumen collecting system, shown in FIG. 15, in the comparative example, is treated by the treatment apparatus 130 of organic compounds shown in FIG. 1; the treated water produced by the treatment apparatus 130 is supplied to a steam generator 150.

When the bitumen collecting system, shown in FIG. 16, in the twelfth embodiment is used to remove and decompose the COD components in waste water, damage to the equipment can be reduced.

Checking to the equipment can thus be reduced and the availability of the apparatus can also be increased.

Thirteenth Embodiment

A bitumen collecting system in a thirteenth embodiment of the present invention will be described with reference to FIG. 17.

Figure 17:
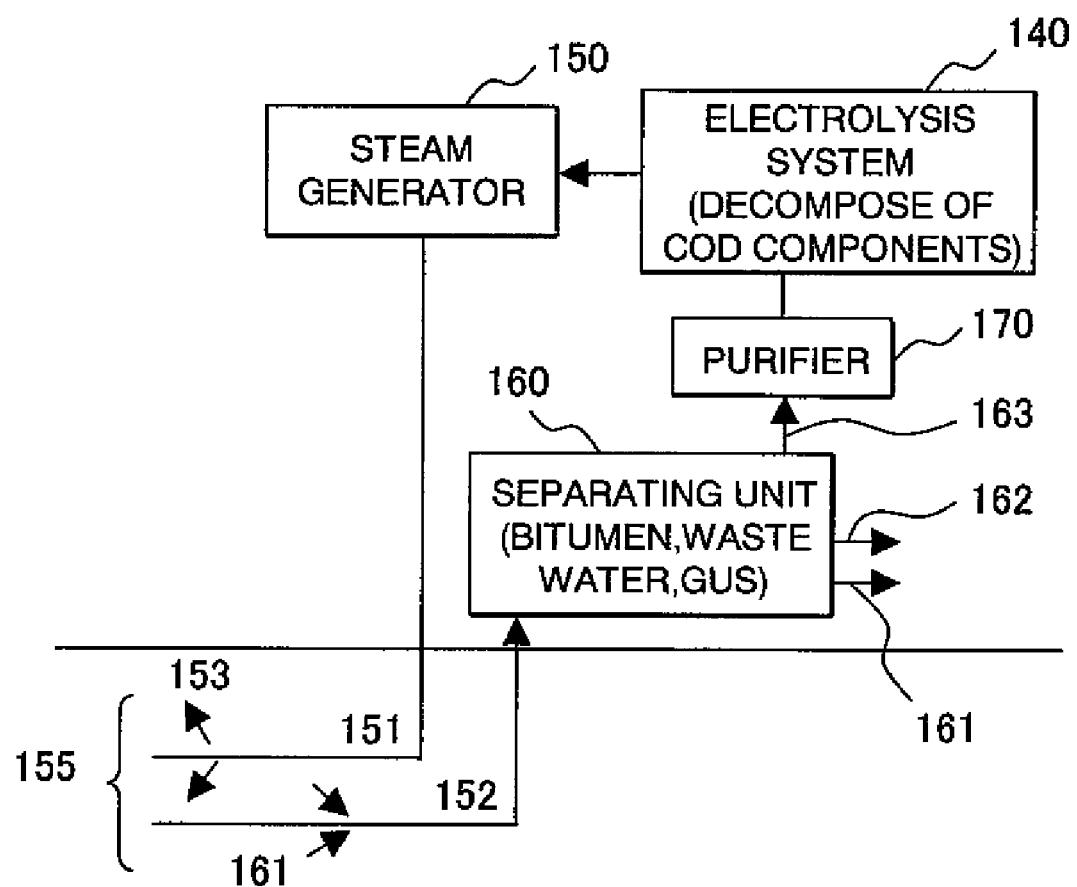
FIG. 17 is a drawing to show a schematic structure of a bitumen collecting system in a thirteenth embodiment of the present invention.

In the bitumen collecting system, shown in FIG. 17, in the thirteenth embodiment, the treated water produced by the purifying unit 170 is passed through an electrolysis system 140 having only the electrolyzer 6, without using the adsorber 2, used to decompose organic compounds instead of the treatment apparatus 130 shown in FIG. 16. In this structure, the treated water is heated during electrolysis in the electrolysis system 140 and supplied to the steam generator 150.

Since energy cost involved in steam production by the steam generator 150 can thereby be reduced, both treatment and recycling of waste water and a reduction in production cost can be achieved.

Although, in the above twelfth and thirteenth embodiments, bitumen collecting systems using the treatment apparatus of organic compounds shown in FIG. 1 have been described, a bitumen collecting system using another treatment apparatus of organic compounds in other embodiments may be used.

The present invention is applicable to water treatment in which organic compounds included in waste water or discharged water is separated, oxidized, and decomposed to reduce COD and TOC to less than relevant discharge criteria. It is also possible to recycle the waste water.

What is claimed is:

1. A treatment apparatus of an organic compound included in waste water comprising:
an adsorber filled with an adsorbent therein, the adsorbent being configured to adsorb the organic compound included in waste water; and
an electrolyzer having an anode and a cathode therein, the anode and cathode configured to supply a current between the anode and cathode so as to electrolyze water including an electrolyte;
wherein waste water including the organic compound is supplied to the adsorber, an electrolyte resulting from electrolysis in the electrolyzer is circulated and supplied to the adsorber through pipes so that the organic compound adsorbed by the adsorbent is desorbed or decomposed.

2. The treatment apparatus of an organic compound included in waste water according to claim 1, wherein a main component of the organic compound is an organic acid.

3. The treatment apparatus of an organic compound included in waste water according to claim 1, wherein the adsorbent is activated carbon or zeolite.

4. A treatment apparatus of an organic compound included in waste water comprising:
an adsorber filled with an adsorbent therein; and
an electrolyzer having an anode and a cathode therein and a current being supplied between the anode and cathode so as to electrolyze water including an electrolyte;
wherein waste water including the organic compound is supplied to the adsorber for adsorbing the organic compound by the adsorbent filled in the adsorber, an electrolyte resulting from electrolysis in the electrolyzer is circulated and supplied to the adsorber through pipes so that the organic compound adsorbed by the adsorbent is desorbed or decomposed, and
the anode comprises a titanium substrate and a layer including at least one of platinum, ruthenium, iridium, palladium, and rhodium formed on the titanium substrate.

5. A treatment apparatus of an organic compound included in waste water comprising:
an adsorber filled with an adsorbent therein; and
an electrolyzer having an anode and a cathode therein and a current being supplied between the anode and cathode so as to electrolyze water including an electrolyte;
wherein waste water including the organic compound is supplied to the adsorber for adsorbing the organic compound by the adsorbent filled in the adsorber, an electrolyte resulting from electrolysis in the electrolyzer is circulated and supplied to the adsorber through pipes so that the organic compound adsorbed by the adsorbent is desorbed or decomposed, and
the electrolyte is sodium chloride or potassium chloride.

6. A treatment apparatus of an organic compound included in waste water comprising:
a plurality of adsorbers filled with an adsorbent therein, respectively, each adsorber configured to adsorb the organic compound included in the waste water; and
an electrolyzer including an anode and a cathode therein, the anode and cathode configured to supply a current between the anode and cathode so as to electrolyze water including an electrolyte;
a selective supplying unit configured to selectively supply the waste water including the organic compound to an adsorber in the plurality of adsorbers;
a unit configured to detect a concentration of the organic compounds is at an exit of the adsorber, and when adsorbing performance is detected as being lowered, to switch a destination to supply the waste water over to another adsorber in the plurality of adsorbers; and
a pipe to supply and circulate an electrolyte resulting from electrolysis in the electrolyzer to the adsorber, so that the organic compounds adsorbed by the adsorbent in the adsorber, of which adsorbing performance is lowered, is desorbed or decomposed.

7. The treatment apparatus of an organic compound included in waste water according to claim 6, wherein a main component of the organic compounds is an organic acid.

8. The treatment apparatus of an organic compound included in waste water according to claim 6, wherein the adsorbent is activated carbon or zeolite.

9. A treatment apparatus of an organic compound included in waste water comprising:
a plurality of adsorbers filled with an adsorbent therein, respectively; and
an electrolyzer including an anode and a cathode therein and a current being supplied between the anode and cathode so as to electrolyze water including an electrolyte;
a selectively supplying means to supply the waste water including the organic compound to one adsorber in a plurality of adsorbers for adsorbing the organic compound included in the waste water by the adsorbent filled in the one adsorber and a concentration of the organic compound is detected at an exit of the one adsorber and when adsorbing performance is lowered, a destination to supply the waste water is switched over to the adsorber in the plurality of adsorbers for adsorbing the organic compound included in the waste water; and
a pipe to supply and circulate an electrolyte resulting from electrolysis in the electrolyzer to the one adsorber so that the organic compound adsorbed by the adsorbent in the one adsorber, of which adsorbing performance is lowered, is desorbed or decomposed,
wherein the anode comprises a titanium substrate and a layer including at least one of platinum, ruthenium, iridium, palladium, and rhodium formed on the titanium substrate.

10. A treatment apparatus of organic compound included in waste water comprising:
a plurality of adsorbers filled with an adsorbent therein, respectively; and an electrolyzer including an anode and a cathode therein and a current being supplied between the anode and cathode so as to electrolyze water including an electrolyte;

a selectively supplying means for supply the waste water including the organic compound to one adsorber in a plurality of adsorbers for adsorbing the organic compound included in the waste water by the adsorbent filled in the one adsorber and a concentration of the organic compound is detected at an exit of the one adsorber and when adsorbing performance is lowered, a destination to supply the waste water is switched over to other adsorber in the plurality of adsorbers for adsorbing the organic compound included in the waste water; and a pipe to supply and circulate an electrolyte resulting from electrolysis in the electrolyzer to the one adsorber, so that the organic compound adsorbed by the adsorbent in the one adsorber, of which adsorbing performance is lowered, is desorbed or decomposed, wherein the electrolyte is sodium chloride or potassium chloride.

11. A treatment system of organic compounds included in waste water comprising:

a coagulating vessel to add a coagulant and a magnetic particles to the waste water including the organic compounds so as to form a flock including the magnetic particles;

a separating unit having a magnetic separator to magnetically separate the flock formed in the waste water and a rotating membrane filter for passing the waste water from a mixture of the waste water and flock;

an adsorber filled with an adsorbent disposed downstream in a direction toward the waste water passed through the rotating membrane filter; and an electrolyzer having an anode and a cathode therein and a current being supplied between the anode and cathode so as to electrolyze water including an electrolyte and produce an electrolyte;

wherein the electrolyte is supplied to the adsorbent in the adsorber from the electrolyzer so as to contact the electrolyte with the adsorbent adsorbed the organic compounds in the waste water, so that the organic compounds adsorbed by the adsorbent are desorbed or decomposed.

12. The treatment apparatus of an organic compound included in waste water according to claim 1, wherein an electrolyte output from the adsorber is returned to the electrolyzer.

* * * * *